Oct. 17, 1961 L. C. ZONKER 3,004,670
COMBINED FUEL FILTER AND LOCK-OFF VALVE AND FUEL FILTER
Filed Feb. 3, 1958
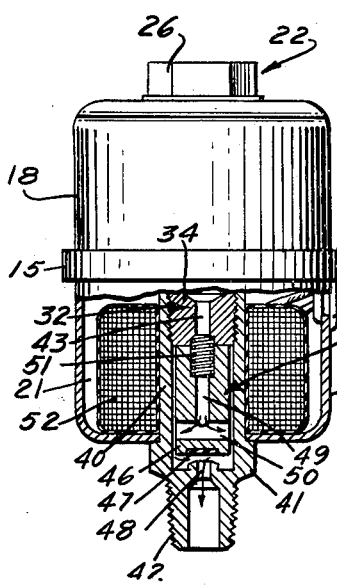
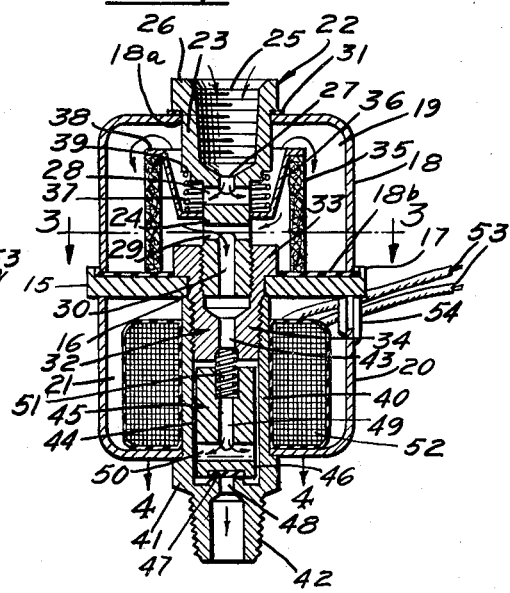
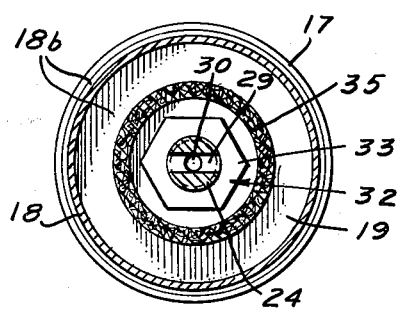
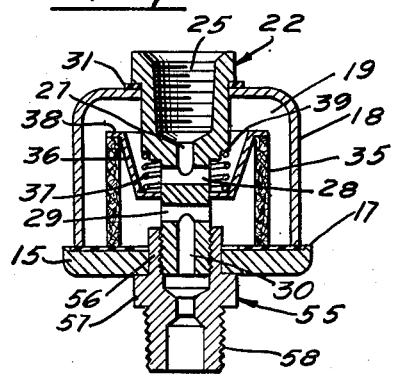
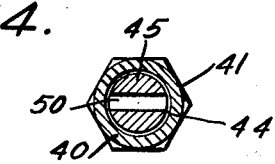
Lawrence C. Zonker,
INVENTOR.
BY
Attorney

United States Patent Office 3,004,670
Patented Oct. 17, 1961

3,004,670
COMBINED FUEL FILTER AND LOCK-OFF VALVE AND FUEL FILTER
Lawrence C. Zonker, Los Angeles, Calif., assignor to Beam Products Mfg. Co., Los Angeles, Calif., a corporation of California
Filed Feb. 3, 1958, Ser. No. 712,728
2 Claims. (Cl. 210—429)

My invention relates to fuel-supply systems for the operation of internal-combustion engines as particularly used to propel vehicles. Such systems are designed to supply either liquid petroleum gas or gasoline to the engine under the control of lock-off valves which are selectively operated electrically to supply one form of fuel or the other, to the engine at the option of the operator.

In such fuel-conversion-supply systems there is embodied filters for removing foreign matter from either type of fuel in its transit from a source to the engine preferably ahead of the lock-off valves.

Heretofore, the lock-off valve and filter, whether for one type of fuel or the other, has been made as two separate units requiring separate connections to incorporate them in the system, multiplication of parts, increasing the assembly operations, and rendering the manufacture thereof relatively expensive.

The purpose of my invention is to provide a structure by which the fuel lock-off valve and the fuel filter are combined in a single unitary structure such as to require a simple operation to incorporate the structure into the fuel-supply system, and to permit disassembly of the parts of either the lock-off valve or the fuel filter without disturbing the parts of the other, thus making it possible to remove, clean, and replace the filter element of the filter, or to repair or replace the parts of the lock-off valve. Additionally, the overall size of the lock-off valve and fuel filter are greatly reduced, as well as the cost of manufacture, both as compared to making the two units separately.

It is also a purpose of my invention to provide a fuel filter which may or may not be incorporated in a single unit structure embodying both the filter and the lock-off valve, and wherein it not only consists of a minimum number of parts that can be readily assembled and disassembled, but is highly effective to remove all foreign matter from the fuel in its passage to the engine.

I will describe only one form of combined fuel filter and lock-off valve, and one form of fuel filter, each embodying my invention, and will then point out the novel features thereof in claims.

In the accompanying drawings:

FIG. 1 is a view showing in elevation and partly in section one form of combined fuel filter and lock-off valve embodying my invention.

FIG. 2 is a complete vertical sectional view of the combined fuel filter and lock-off valve.

FIG. 3 is a transverse sectional view taken on the line 3—3 of FIG. 2.

FIG. 4 is a transverse sectional view taken on the line 4—4 of FIG. 2.

FIG. 5 is a vertical sectional view of the fuel filter adapted for use separately from the lock-off valve.

Referring more particularly to the drawings, my invention in its present embodiment comprises a center plate 15 of disk form and preferably made of steel. The plate 15 is provided at its center with an opening 16 and on its top side with an annular flange 17 on the upper edge thereof. Mounted on the top side of the plate 15 is an upper housing 18 of inverted-cup form preferably made of steel and provided in its top center with an opening 18a.

The diameter of the lower end of the housing 18 is such that it fits snugly within the annular flange 17. A gasket 18b of disk form, and preferably made of neoprene, seats on the top side of the plate 15 within the flange 17 and has its marginal edge interposed between the lower edge of the housing 18 and the plate to form a fluid-tight seal between the two.

The housing 18 coacts with the plate 15 to provide an upper compartment 19 in which the fuel-filtering unit of my invention is contained.

Mounted on the lower side of the plate 15 is a lower housing 20, similar in size and shape to the housing 18. This housing 20 coacts with the plate 15 to form a lower compartment 21 in which is contained the lock-off valve unit, and it is secured to the plate 15 through certain elements as will be later described herein.

The fuel-filtering unit of my invention comprises a fuel inlet member 22 which is in the form of a bolt and has an upper part 23 and a lower part 24 integral with the upper part and made of steel. The upper part 23 is of greater diameter than the lower part and is tubular to form a socket 25 in which one end of a feed line (not shown) may be screw-threaded, and which line leads to a source of liquid fuel. The upper end of the part 23 is exteriorly formed to provide a hexagonal head 26.

The lower part 24 of the member 22 is formed with an axial passage 27 which communicates with the bottom of the socket 25 and with an upper transverse passage 28 in the part 24. Likewise in the part 24 is a lower transverse passage 29 which at its center communicates with a lower axial passage 30 that opens to the lower end of the part 24.

This fuel inlet member 22 is adapted to be extended downwardly through the housing opening 18a and into the compartment 19, so that the head 26 reposes on the top side of the housing with a fiber gasket 31 interposed between the head and the housing to seal the joint between the two.

The lower end portion of the lower member part 24 is screw threaded into the upper end of a coupling member 32 which is formed at its upper end with a hexagonal head 33, while its shank 34 extends downwardly through the center opening 16 in the plate 15. The head 33 is welded or otherwise fixed to the top side of the plate 15 so that the coupling member 32 is secured to the plate against rotation thereby permitting the member 22 to be screw-threaded into the coupling member, and thus securely clamp the housing 18 to the top side of the plate with its lower edge abutting the gasket 18b to form a fluid-tight seal.

Before the housing 18 and the fuel-inlet member 22 are assembled on the plate 15 as described, a tubular fuel-filter element 35, preferably constructed of sintered bronze, is mounted on the plate 15, with the lower end thereof resting on the gasket 18b and concentrically of the head 33.

Means is provided for holding the element 35 firmly against the gasket 18b which, in the present instance, comprises a cup-shaped metallic member 36, and a coiled expansible spring 37. The cup member 36 is tapered and formed at its upper end with an annular flange 38 which reposes on the upper end of the filter element 35. The spring 37 is interposed between the bottom of the member 36 and an annular shoulder 39 formed on the fuel-inlet member 22 so as to urge the member 35 downwardly and the flange 38 in firm engagement with the upper end of the filter element.

It will be understood that to assemble the parts as above described once the filter-element member 36 and spring 37 are assembled, the member 22 is extended downwardly through the cup member 36 and threaded into the head 33, thus placing the spring under compression to cause the member 36 to hold the filter element 35 firmly against the gasket 18b, and in concentric relation to the fuel-inlet member 23.

In the present embodiment of my invention the coupling member 32 constitutes a part of the lock-off valve unit, and it is coupled to a fuel-outlet member 40 which is of tubular form and interiorly threaded at its upper end so as to have threaded engagement with that portion of the coupling member projecting downwardly from the lower side of the plate 15.

The member 40 extends downwardly through a suitable opening in the bottom of the housing 20 where it is formed with a hexagonal head 41 upon which the housing is seated, and below the head the member is formed with an exteriorly screw-threaded outlet fitting 42 which is adapted to be coupled to that part of the fuel line leading to the fuel regulator or carburetor as the case may be.

The coupling member 32 is formed with an axial passage 43 which provides communication between the passage 30 and the member 22 and the interior of the outlet member 40. Loosely fitted within the member 40 for axial movement and to provide a passage 44 between it and the member, is a steel plunger 45 that is formed on its lower end with a valve 46 having a neoprene seat 47, and controlling an outlet port 48 in the member 40 at the junction of the shoulder 41 and the fitting 42.

The plunger 45 is formed with an axial passage 49, and a transverse passage 50 at the lower end of the latter. A coil expansible spring 51 extends into the passages 43 and 49 and against shoulders therein, for urging the plunger 45 downwardly to cause the valve 46 to close the outlet port 48.

Fixed to and extending around the outlet member 40 and of course contained within the housing 20, is a solenoid winding 52, the plunger 45 constituting the movable core of the solenoid. The terminals 53 of this winding 52 extend through a grommet 54 in the housing 20 for connection to a source of current (not shown).

The assembly of the parts of the lock-off valve unit to hold them in their respective positions, as contained within the housing 20 should be obvious from the foregoing description.

In the use of the combined fuel-filter unit and lock-off valve unit, as connected in the feed-line between a source of liquid petroleum gas or gasoline, and a fuel regulator or carburetor as the case may be, fuel enters the socket 25 and passes downwardly through the passage 27, then into the upper transverse passage 28. From this passage 28 the fuel enters the retaining member 36 and passes upwardly and outwardly thereof into the compartment 19 and then through the filter element 35 to the inner side thereof. From here the fuel passes through the lower transverse passage 29 then downwardly through the axial passage 30 into the passage 43 of the coupling member 32. From the passage 43 the fuel flows through the spring 51 into the passage 49 and then outwardly through the transverse passage 50, into the passage 44.

Since the plunger 45 is normally urged downwardly by the spring 51 to cause the valve 46 to close the port 48, no fuel can be discharged from the fitting 42. However, when the solenoid winding 52 is energized the plunger 45 is drawn upwardly against the tension of the spring 51 to cause the valve 46 to open the port 48, thereby permitting fuel to flow from the fitting 42. In its flow through the fuel-inlet member 22 and the filter element 35 as above described, any particles of foreign matter contained in the fuel are removed therefrom by the element 35 before it reaches the outlet port 48, so that the fuel as delivered to the regulator or carburetor is free of foreign particles.

It will be apparent from the structure of the fuel-filter unit that when it becomes necessary to remove, clean and replace the filter element 35, these operations can be effected without disturbing the parts of the lock-off valve. Removal of the filter element can be readily accomplished by unscrewing the member 22 from the coupling member 32 thus allowing removal of the housing 18 to gain access to and remove the filter element.

It will also be apparent from the structure of the lock-off valve that when it becomes necessary to repair or replace plunger 45, spring 51, winding 52, or valve seat 47, unscrewing of the fuel-outlet member 40 from the coupling member 32 is all that is required.

Referring now to FIG. 5, a modified construction of the fuel-filter unit of FIG. 2 is illustrated to show that it can be made so as to be used separately from the lock-off valve unit. The only structural modification required is to substitute for the coupling number 32 an outlet fitting 55 which has an upper tubular portion 56 that extends upwardly through the center opening 16 of the plate 15 and screw-threadedly receives the lower end of the member 22.

The fitting 55 has a hexagonal outer portion 57 which abuts the underside of the plate 15, and a tapered screw-threaded lower portion 58 which is adapted to be screwed into that part of the fuel line (not shown) that leads to the lock-off valve unit where the latter is made separately from the filter unit.

Thus with the fuel-inlet end of the member 22 connected to a source of fuel supply, the fuel in transit to the fitting 55 will pass through the filter element 35 as described in connection with FIG. 2, to remove foreign particles from the fuel before it exits from the fitting.

Although I have herein shown and described only one form of combined fuel filter and lock-off valve and one form of fuel filter, each embodying my invention, it is to be understood that various changes and modifications may be made herein without departing from the spirit of my invention and the spirit and scope of the appended claims.

What I claim is:

1. A combination fuel filter and lock-off valve including a plate having an opening therein; a first housing at one side of said plate coacting therewith to form a first compartment; a filter element of tubular form mounted on said plate within said first compartment; an elongated fuel inlet member having one extremity thereof disposed externally of said first housing and having a first axial bore in said one extremity and a first radial passage communicating with said first axial bore to permit fluid to flow through said first radial passage into said first compartment; said fuel inlet member having a second axial bore and a second radial passage communicating therewith, said second radial passage being disposed internally of said tubular filter element; retention means interposed between said filter element and said fuel inlet member for retaining said filter element in fixed position about said member whereby fuel flowing through one extremity of said member will pass through said first axial bore and said first radial passage outwardly of said filter element and through said filter element into said second radial passage and said second axial bore; a second housing on the other side of said plate coacting therewith to form a second compartment; a tubular coupling member having one extremity secured to the other extremity of said fuel inlet member and its other extremity projecting through said plate opening; a tubular fuel outlet member having one extremity secured to the other extremity of said coupling member and its other extremity incorporating an outlet port and projecting exteriorly of said second housing; a solenoid winding located in said second compartment in encompassing relationship with said fuel outlet member; a solenoid plunger valve mounted in said tubular fuel outlet member; and spring means in said fuel outlet member interposed between the confronting extremities of said fuel outlet member and said coupling member for urging said plunger valve axially to close said outlet port, said plunger valve having an axial bore and a radial passage communicating with said axial bore providing fluid communication between said tubular coupling member and said tubular fuel outlet member at a point above said outlet so that, when said solenoid is energized to move said plunger valve against the bias of said spring means, fuel can flow through said coupling member and said axial bore and radial passage of said plunger valve to said outlet port.

2. In a fuel filter and lock-off valve, the combination of: a first housing; a second housing; a mounting plate interposed between the confronting extremities of said first and second housings to define first and second compartments, respectively, with said first and second housings, said first and second housings and said plate having concentric openings therein; a fuel inlet member extending through said opening in said first housing and having one extremity mounted externally of said first housing and its other extremity extending into said first compartment, said fuel inlet member incorporating a first axial bore in said one extremity and a radial passage in fluid communication with said first compartment and a second axial bore and second radial passage in fluid communication with said first compartment; a tubular filter encompassing said fuel inlet member and disposed in said first compartment between said first and second radial bores whereby fuel flows from said first radial passage externally of said filter into said compartment and through said filter into said second radial passage and said second axial bore; a tubular coupling mounted in said opening in said plate and having an axial bore therein, one extremity of which is engaged by the other extremity of said fuel inlet member to maintain said fuel inlet member and said first housing in operative relationship with said plate; a fuel outlet member having one extremity secured to the other extremity of said coupling and having a bore therein terminating at an outlet port in its other extremity, said other extremity projecting through said opening in said second housing to maintain said second housing in operative relationship with said filter; a solenoid winding disposed in said second compartment in encompassing relationship with said fuel outlet member; a plunger valve mounted in said bore of said fuel outlet member to lock-off the flow of fluid to said outlet, said plunger valve having an axial bore and radial passage communicating with the bore of said coupling and the bore of said fuel outlet member; and a spring in said bore of said fuel outlet member engaged with said plunger valve to urge it into lock-off relationship with said outlet port.

References Cited in the file of this patent
UNITED STATES PATENTS

| | | |
|---|---|---|
| 738,486 | Rogers | Sept. 8, 1903 |
| 794,840 | Barker | July 18, 1905 |
| 808,910 | Dunham | Jan. 2, 1906 |
| 1,212,104 | Procker | Jan. 9, 1917 |
| 1,516,132 | Allen | Nov. 18, 1924 |
| 1,746,274 | Otis | Feb. 11, 1930 |
| 1,863,103 | Dowins | June 14, 1932 |
| 2,279,243 | Parsons | Apr. 7, 1942 |
| 2,310,516 | Clark | Feb. 9, 1943 |
| 2,488,921 | Mathews | Nov. 22, 1949 |
| 2,699,259 | Birkemeier | Jan. 11, 1955 |
| 2,726,770 | Sette | Dec. 13, 1955 |
| 2,850,685 | Ray | Sept. 2, 1958 |
| 2,860,850 | Rhodes et al. | Nov. 18, 1958 |